United States Patent
Marks et al.

(10) Patent No.: US 7,686,386 B2
(45) Date of Patent: Mar. 30, 2010

(54) AUTOMOTIVE BODY AND TRIM ASSEMBLY WITH COMPLEMENTARY LOCATING AND POSITIONING FEATURES AND METHOD OF ASSEMBLING SAME

(75) Inventors: Stephen W. Marks, Clarkston, MI (US);
Steven P. Balgaard, Fenton, MI (US);
Hirde N. Bhatia, Canton, MI (US);
Victoria L. Enyedy, Troy, MI (US);
Wayne S. Wilson, Lake Orion, MI (US);
Charles S. Boughton, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 79 days.

(21) Appl. No.: 11/767,719

(22) Filed: Jun. 25, 2007

(65) Prior Publication Data
US 2008/0315627 A1 Dec. 25, 2008

(51) Int. Cl.
*B60R 13/02* (2006.01)
(52) U.S. Cl. .............. 296/193.06; 296/1.08; 296/39.1; 296/203.03
(58) Field of Classification Search ............ 296/39.1, 296/193.06, 93, 203.03, 1.08
See application file for complete search history.

(56) References Cited

U.S. PATENT DOCUMENTS

| | | | |
|---|---|---|---|
| 5,810,428 A * | 9/1998 | Maki ................ | 296/203.02 |
| 5,941,597 A * | 8/1999 | Horiuchi et al. ....... | 296/203.01 |
| 6,340,200 B1 * | 1/2002 | Enomoto et al. ....... | 296/187.09 |
| 6,854,786 B2 * | 2/2005 | Berglund et al. ........ | 296/146.9 |
| 6,854,790 B2 * | 2/2005 | Yoshida ............... | 296/187.05 |
| 7,229,124 B2 * | 6/2007 | Luik et al. ............ | 296/187.05 |
| 2001/0024052 A1 * | 9/2001 | Takahara ............... | 296/188 |
| 2006/0125275 A1 * | 6/2006 | Wato et al. ............ | 296/93 |

OTHER PUBLICATIONS

2004 Model Year Lexus 330 RX A-Pillar Trim Member.

* cited by examiner

*Primary Examiner*—Dennis H Pedder
*Assistant Examiner*—Pinel E Romain

(57) ABSTRACT

An automotive body and trim assembly is provided that utilizes locating features on only a single sheet metal layer of a multi-layer body frame pillar to position a trim member, thus minimizing variability in the final assembled position of the trim member. The single sheet metal layer has both a fore-aft-locating feature and a cross-car-locating feature. A fore-aft-positioning feature and a cross-car-positioning feature on the pillar trim member are spaced to permit contact with the fore-aft-locating feature and the cross-car-locating feature, respectively when the pillar trim member is assembled with the body frame pillar, so that only the single sheet metal layer determines the fore-aft and cross-car position of the pillar trim member. A method of assembling a pillar trim member and a body frame pillar having multiple sheet metal layers is also provided.

13 Claims, 2 Drawing Sheets

AUTOMOTIVE BODY AND TRIM ASSEMBLY WITH COMPLEMENTARY LOCATING AND POSITIONING FEATURES AND METHOD OF ASSEMBLING SAME

TECHNICAL FIELD

The invention relates to an automotive body and trim assembly that includes a body frame pillar having locating features and a pillar trim member having positioning features positionable at the locating features for controlling the assembled position of the pillar trim member.

BACKGROUND OF THE INVENTION

Automotive manufacturers strive for assembly processes and component designs that enable repeatable and reliable positioning of vehicle components. The ability to achieve desired assembly configurations enhances consumer perception of quality. Additionally, aesthetic qualities often require minimization of positioning error. For example, the final assembled position of a body trim member depends in part upon its positioning on the body component to which it is to be attached. Even when locating features are provided on the body component to aid in proper positioning of the trim member, the final position may be impacted by variability in the body component. For example, when the body component itself is formed or assembled from several components, such as multiple layers of sheet metal, the dimensional tolerance "stack-up" of these many components leads to variability in the position of the locating features.

Generally, a body frame pillar, such as an A-pillar, has locating features for receiving fasteners to fasten a pillar trim member to the body frame pillar. These "primary" locating features thus determine the final position of the trim member in the vehicle when it is fastened to the body frame pillar.

SUMMARY OF THE INVENTION

An automotive body and trim assembly is provided that utilizes locating features on a single sheet metal layer of a multi-layer body frame pillar that act as "secondary" locating features to supplement the primary locating features (i.e., the fastening points) of the body frame pillar, thus fine-tuning and minimizing variability in the final assembled position of the trim member. The single sheet metal layer has both a fore-aft-locating feature and a cross-car-locating feature. A fore-aft-positioning feature and a cross-car-positioning feature on the pillar trim member are spaced to permit contact with the fore-aft-locating feature and the cross-car-locating feature on the body frame pillar, respectively, when the pillar trim member is assembled with (i.e., fastened to) the body frame pillar, so that the single sheet metal layer determines the final, assembled fore-aft and cross-car position of the pillar trim member. An additional fore-aft-locating feature may be provided on the single sheet metal layer, which an additional fore-aft-positioning feature of the trim member contacts during assembly of the trim member to the body frame pillar.

The single sheet metal layer may be an outer sheet metal layer of a body frame pillar that also includes an inner sheet metal layer and a reinforcement sheet metal layer. The fore-aft-locating feature may be a rear surface of the outer sheet metal layer that is exposed by providing recesses in the inner and reinforcement sheet metal layers to allow a laterally extending rib of the trim member, serving as the fore-aft-positioning feature, to contact the rear surface. The cross-car-locating feature may be an inboard edge that extends further inboard than the inner sheet metal layer and the reinforcement sheet metal layer so that a cross-car-positioning feature of the trim member, such as an outboard surface, may be positioned against the inboard edge.

Optionally, the single sheet metal layer that has the fore-aft and cross-car-locating features may also have an elevation-locating feature which an elevation-positioning feature of the trim member contacts to establish the elevational position of the trim member. For example, a notch in the inboard edge may serve as the elevation-locating feature for a lateral extension from the outboard surface, serving as the elevation-positioning feature, that is characterized by a shape matable with the notch.

In one embodiment, the body frame pillar is an A-pillar and the trim member is an A-pillar trim member that is positioned to cover the A-pillar, as well as to cover or obscure from view most or all of a blackout band on an adjacent windshield, while at the same time minimizing a gap between the trim member and the windshield so that outward visibility through the windshield is maximized. It should be appreciated that the automotive body and trim assembly is not limited to an A-pillar and an A-pillar trim member.

Accordingly, a method of assembling a pillar trim member and a body frame pillar having multiple sheet metal layers includes exposing a longitudinal edge and a surface of a single sheet metal layer of the body frame pillar to establish a cross-car and a fore-aft-locating feature, respectively, on the single sheet metal layer. The method further includes contacting the body frame pillar with the pillar trim member at the longitudinal edge and at the exposed surface during attachment of the pillar trim member for attachment to the body frame pillar. The longitudinal edge and the surface of the single sheet metal layer thus determines the assembled cross-car and fore-aft position of the pillar trim member. A notch may be provided in the longitudinal edge, into which an extension of the pillar trim member is automatically guided when contacting the body frame pillar with the pillar trim member during attachment of the pillar trim member into the body frame pillar to thereby determine the elevational position of the pillar trim member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
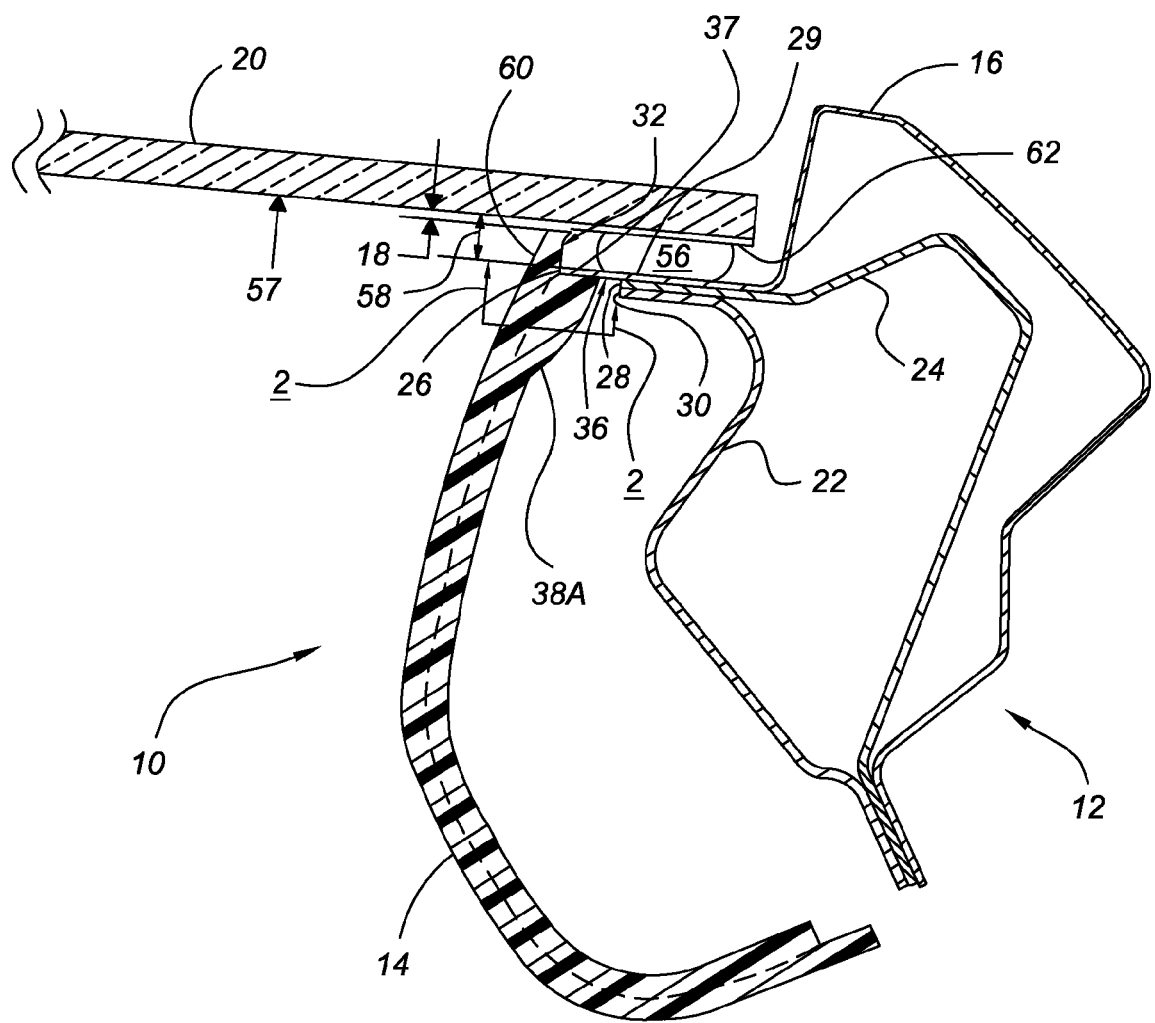
FIG. 1 is a cross-sectional top view of an A-pillar with an A-pillar trim member assembled thereon, and with a windshield shown in partial fragmentary cross-sectional view connected to the A-pillar.

Referring to the drawings, wherein like reference numbers refer to like components, FIG. 1 shows an automotive body and trim assembly 10 with an A-pillar 12 and an A-pillar trim member 14 connected thereto. The automotive body and trim assembly 10 has attachment areas with primary locating features and attachment features (e.g., fasteners, not shown) that are received in the primary locating features to secure the A-pillar trim member to the A-pillar 12, as is known. As described below, the automotive body and trim assembly 10 is provided with supplemental locating features and positioning features that work in conjunction with the primary locating features to fine tune, i.e., more precisely control, the final assembled position of the A-pillar trim member 14. The locating features and positioning features described below are these supplemental features.

The A-pillar 12 has multiple sheet metal layers; however, locating features are included on only one of the sheet metal layers (i.e., an outer sheet metal layer 16) and positioning features on the A-pillar trim member 14 contact these locating features during positioning, such that the assembled position of the A-pillar trim member 14 is established by the dimensions and position of the outer sheet metal layer 16, and is not affected by build and assembly variations in the other sheet metal layers. The ability to control the assembled position of the A-pillar trim member 14 afforded by the automotive body and trim assembly 10 provides greater control of a clearance gap 18 between the A-pillar trim member 14 and a windshield 20 connected to the A-pillar 12 forward of the A-pillar trim member 14.

Those skilled in the art of automotive assembly will readily recognize that a "fore-aft position" refers to the position of a component along the length of a vehicle (i.e., between the front bumper to the rear bumper). In FIG. 1, moving toward the top of FIG. 1 (i.e., above the windshield 20) is a forward direction and moving toward the bottom of FIG. 1 (i.e., below the windshield 20) is a rearward direction, the fore-aft position of a component thus being its vertical position between the top and the bottom of FIG. 1. Thus, a "fore-aft-locating feature" is a structural feature of a first component that a second component is located on to establish the fore-aft position of the second component. The second component may have a "fore-aft-positioning feature" which is a structural feature of the second component that may be positioned on, i.e., put into contact with, the fore-aft-locating feature of the first component to establish the fore-aft position of the second component.

Those skilled in the art will further recognize that a "cross-car position" refers to the position of a vehicle component laterally, from the driver side to the passenger side of a vehicle, and is represented in FIG. 1 with the driver side being to the left side and the passenger side being to the right side of FIG. 1. The A-pillar 12 is a passenger side A-pillar in FIG. 1. Thus, a "cross-car-locating feature" is a structural feature of a first component that a second component is located on to establish the cross-car position of the second component. The second component may have a "cross-car-positioning feature" which is a structural feature of the second component that may be positioned on, i.e., put into contact with, the cross-car-locating feature of the first component to establish the cross-car position of the second component.

Figure 2:
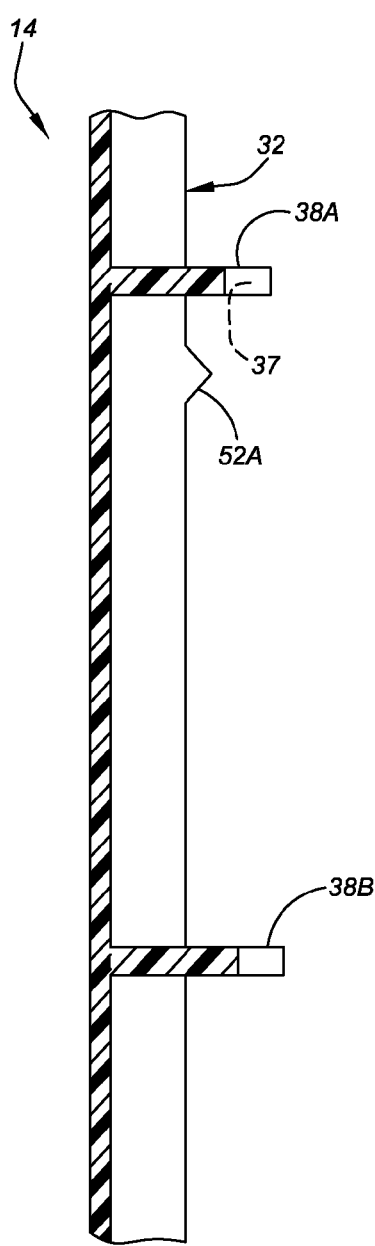
FIG. 2 is a cross-sectional, fragmentary side view of the A-pillar trim member of FIG. 1 taken at the arrows shown in FIG. 1.
Figure 3:
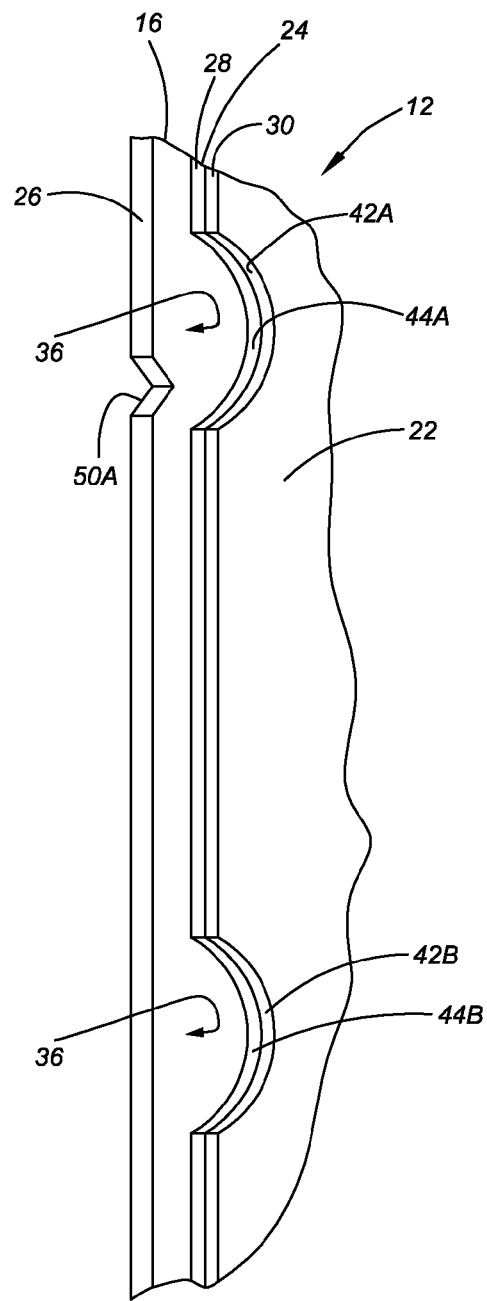
FIG. 3 is a perspective illustration in fragmentary view of the A-pillar of FIG. 1.

As used herein, an "elevational position" is a position of a component on a vehicle between the bottom and the top of the vehicle, in a vertical direction. Referring to FIGS. 2 and 3, moving toward the top of the Figures is increasing in elevation and moving toward the bottom of the Figures is decreasing in elevation. Thus, an "elevation-locating feature" is a structural feature of a first component that a second component is located on to establish the elevational position of the second component. The second component may have an "elevation-positioning feature" which is a structural feature of the second component that may be positioned on, i.e., put into contact with, the elevation-locating feature of the first component to establish the elevational position of the second component.

Those skilled in the art will also recognize that "outboard" refers to a position of a component laterally outward from a longitudinal centerline running the length of the vehicle. For example, In FIG. 1, an inner sheet metal layer 22 of the A-pillar 12 is outboard of the A-pillar trim member 14.

The A-pillar 12 includes the inner sheet metal layer 22, the outer sheet metal layer 16, and a reinforcement sheet metal layer 24 positioned between the inner sheet metal layer 22 and the outer sheet metal layer 16. The inner sheet metal layer 22 is referred to as "inner" because it is generally more inboard than the outer sheet metal layer 16, with an important exception being that the outer sheet metal layer 16 has an innermost, inboard edge 26, which is further inboard than an inboard edge 28 of the reinforcement sheet metal layer 24 and than an inboard edge 30 of the inner sheet metal layer 22 at a flange 29 formed where the three sheet metal layers 16, 24 and 22 are stacked together. The inboard edge 26 serves as a cross-car-locating feature along which an outboard surface 32 of the A-pillar trim member 14 is positioned to establish the cross-car (i.e., the lateral) position of the A-pillar trim member 14.

Referring to FIG. 3, a perspective illustration of the A-pillar 12, viewed generally from a position inboard and rearward therefrom, illustrates the inboard edge 26 extending further inboard than the inboard edges 28 and 30, forming the dominant or lead inboard edge of the A-pillar 12. Referring to FIG. 2, the outboard surface 32 of the A-pillar trim member 14 can be abutted against the inboard edge 26, as shown in FIG. 1, to determine the cross-car position of the A-pillar trim member 14.

Referring again to FIG. 1, a rear surface 36 of the outer sheet metal layer 16 is used as, and may be referred to as, a fore-aft-locating feature for a forward edge 37 of an outboard-extending rib 38A on the A-pillar trim member 14. The forward edge 37 may be positioned to abut the rear surface 36 when the outboard surface 32 is positioned to abut the inboard edge 26. Referring to FIGS. 2 and 3, the inner sheet metal layer 22 defines a recess 42A extending outboard from the inboard edge 30. The reinforcement sheet metal layer 24 also forms a recess 44A aligned with recess 42A so that the rear surface 36 is exposed to allow the forward edge 37 of rib 38A to abut there against. The forward edge 37 is facing into the page in FIG. 2, as indicated by the phantom reference line. The rib 38A, and more specifically the forward edge 37 thereof, thereby acts as, and may be referred to as, a fore-aft-positioning feature positionable at the rear surface 36. The rib 38A and its forward edge 37 are spaced relative to the outboard surface 32 to allow respective contact with the rear surface 36 and the inboard edge 26. The rib 38A may be dimensioned as desired to control the orientation of the A-pillar trim member 14 relative to the A-pillar 12. For example, the rib 38A could be configured to make the inboard surface 32 of the A-pillar trim member 14 perpendicular to the flange 29, or angled therefrom, as in FIG. 1.

The inner sheet metal layer 22 and the reinforcement sheet metal layer 24 define additional aligned recesses 42B and 44B, respectively, at a location spaced longitudinally from the recesses 42A and 44A to expose the surface 36 of the outer sheet metal layer 16 at this location sufficiently to allow a forward edge (facing into the page in FIG. 2) of an additional outboard extending rib 38B to abut the surface 36 at this location as well. The ribs 38A and 38B are spaced from one another to permit them to be located at the rear surface 36 in the vicinity of the recesses 42A and 42B, respectively. Preferably, the recesses 42A, 44A, 42B and 44B are located relatively near locations at which the trim member 14 is attached to the A-pillar 12, using clips or other known means (i.e., relatively near the "primary" locating features). The interface of the fore-aft-locating feature (rear surface 36) and the cross-car-locating feature (inboard edge 26) with the fore-aft-positioning feature (forward edge 37) and the cross-car-positioning feature (outboard surface 32) provide added stability to the A-pillar trim member 14 once connected to the A-pillar 12 if it is pushed or twisted by a vehicle occupant. The added stability results in part from the fact that the fore-aft-locating feature (rear surface 36) and the cross-car-locating feature (inboard edge 26) are substantially perpendicular to one another, providing stability from a variety of directions if the A-pillar trim member 14 is pushed or twisted.

Referring to FIG. 3, in addition to the fore-aft-locating feature (rear surface 36) and the cross-car-locating feature (inboard edge 26), the outer sheet metal layer 16 defines a notch 50A serving as, and that may be referred to as, an elevation-locating feature. Referring to FIG. 2, a lateral extension 52A extends from the outboard surface 32 of the A-pillar trim member 14, and has a shape that is matable with the notch 50A, to establish the elevational position of the A-pillar trim member 14 when the outboard surface 32 is abutted against the inboard edge 26. In this embodiment, the notch 50A is generally triangular, as is the lateral extension 52A; however, many other shapes and configurations may be used to achieve the elevational position. If desired, an additional notch could be defined by the outer sheet metal layer 16 along the inboard edge 26, such as in the vicinity of recesses 42B and 44B, with an additional lateral extension extending from the outboard surface 32 of the A-pillar trim member 14 to be mated therewith.

Referring again to FIG. 1, the windshield 20 is attached to the A-pillar 12 with an adhesive, shown as a urethane bead 56. An inner surface 57 of the windshield 20 is spaced from the forwardmost edge of the A-pillar 16 by a gap 58. It is apparent that when the A-pillar trim member 14 is positioned on the A-pillar 12, a forward extension 60 of the A-pillar trim member 14 substantially traverses the gap, such that only clearance gap 18 remains. This allows the A-pillar trim member 14 to substantially cover and obscure from view a blackout band 62 positioned along the periphery of the windshield 20 (shown here obscuring the blackout band 62 along the portion of the periphery established by the right lateral edge of the windshield 20). Additionally, by minimizing the gap 18, the width of the windshield viewable from inside of the vehicle is maximized, increasing direct outward vision and improving the overall feeling of spaciousness.

As is apparent from the above description, a method of assembling a pillar trim member with a body frame pillar having multiple sheet metal layers, described with respect to the structure of FIGS. 1-3, includes exposing a longitudinal edge (inboard edge 26) and a surface (rear surface 36) of a single sheet metal layer (i.e., outer sheet metal layer 16) of the A-pillar 12 to establish a cross-car and a fore-aft-locating feature, respectively, on the single sheet metal layer 16. In this embodiment, the exposing step is carried out by providing aligned recesses 42A-44B in the inner sheet metal layer 22 and in the reinforcement sheet metal layer 24, as well as by forming and assembling the A-pillar 12 with the inboard edge 26 further inboard than the inboard edges 28 and 30 of the other sheet metal layers 22 and 24. Next, the method includes contacting the A-pillar 12 with the A-pillar trim member 14 at the inboard longitudinal edge 26 and at the rear surface 36 during attachment of the A-pillar trim member 14 to the A-pillar 12. The contacting occurs as the A-pillar trim member 14 is attached to the A-pillar 12 at the primary locating features, such as with fasteners. The inboard longitudinal edge 26 and the rear surface 36 of the single sheet metal layer (i.e., the outer sheet metal layer 16) thus determines both the final assembled cross-car and fore-aft position of the A-pillar trim member 14. Optionally, if the outer sheet metal layer 16 defines a notch 50A in the inboard edge 26, a lateral extension 52A extending from the outboard surface 32 of the A-pillar trim member 14 is automatically guided into the notch 50A as the fasteners are tightened to secure the A-pillar trim member 14 to the A-pillar 12. The outer sheet metal layer 16 thereby determines the final elevational position of the A-pillar trim member 14 as well.

While the best modes for carrying out the invention have been described in detail, those familiar with the art to which this invention relates will recognize various alternative designs and embodiments for practicing the invention within the scope of the appended claims.

The invention claimed is:

1. An automotive body and trim assembly comprising:
  a body frame pillar having multiple sheet metal layers; wherein one of the sheet metal layers has a fore-aft-locating feature and a cross-car-locating feature; and
  a pillar trim member having a fore-aft-positioning feature and a cross-car-positioning feature spaced relative to one another to permit the fore-aft-positioning feature to contact the fore-aft-locating feature and the cross-car-positioning feature to contact the cross-car-locating feature when the pillar trim member is assembled with the body frame pillar such that the sheet metal layer having the fore-aft-locating feature and the cross-car-locating feature determines the fore-aft and cross-car position of the pillar trim member when the pillar trim member is assembled with the body frame pillar;
  wherein the multiple sheet metal layers include an inner sheet metal layer, an outer sheet metal layer and a reinforcement layer between the inner sheet metal layer and the outer sheet metal layer; wherein the sheet metal layer having the fore-aft-locating feature and the cross-car-locating feature is the outer sheet metal layer; wherein the outer sheet metal layer has an inboard edge running lengthwise along the frame pillar further inboard than the inner sheet metal layer and the reinforcement layer; wherein the inboard edge of the outer sheet metal layer is the cross-car-locating feature; wherein the inner sheet metal layer and the reinforcement layer are characterized by recesses exposing a rear surface of the outer sheet metal layer; and wherein the exposed rear surface of the outer sheet metal layer is the fore-aft-locating feature.

2. The automotive body and trim assembly of claim 1, wherein the fore-aft-locating feature is a first fore-aft-locating feature; wherein the sheet metal layer having the first fore-aft-locating feature has a second fore-aft-locating feature spaced from the first fore-aft-locating feature; and
  wherein the fore-aft positing feature is a first fore-aft-positioning feature; and wherein the pillar trim member has a second fore-aft-positioning feature spaced relative the first fore-aft-positioning feature to permit the first fore-aft-positioning feature to contact the first fore-aft-locating feature and the second fore-aft-positioning feature to contact the second fore-aft-locating feature when the pillar trim member is assembled with the body frame pillar.

3. The automotive body and trim assembly of claim 1 in combination with a windshield secured to the body frame pillar forward thereof to define a gap between an inner surface of the windshield and the body frame pillar; and wherein the pillar trim member substantially traverses the gap when the trim pillar member is assembled to the body frame pillar.

4. The automotive body and trim assembly of claim 3, wherein the windshield is characterized by a blackout band positioned along a periphery thereof and wherein the pillar trim member at least partially covers the blackout band when assembled to the body frame pillar.

5. The automotive body and trim assembly of claim 1, wherein the sheet metal layer having the fore-aft-locating feature and the cross-car-locating feature has an elevation-locating feature; and wherein the pillar trim member has an elevation-positioning feature spaced relative to the fore-aft-positioning feature and the cross-car-positioning feature to permit the elevation-positioning feature to contact the elevation-locating feature when the fore-aft-positioning feature contacts the fore-aft-locating feature and the cross-car-positioning feature contacts the cross-car-locating feature when the pillar trim member is assembled, the sheet metal layer having the elevation-locating feature therefore determining the elevational position of the pillar trim member when the pillar trim member is assembled with the body frame pillar.

6. The automotive body and trim assembly of claim 5, wherein the elevation-locating feature is a notch defined by the sheet metal layer at the cross-car-locating feature; and wherein the elevation-positioning feature is an extension formed in the cross-car-positioning feature characterized by a shape matable with the notch.

7. An automotive body and trim assembly comprising:
an A-pillar having an inner sheet metal layer and an outer sheet metal layer; wherein the outer sheet metal layer has a flange positioned forward of the inner sheet metal layer and extending further inboard thereof to define an inboard edge running lengthwise along the A-pillar; wherein the inner sheet metal layer defines a first recess positioned to expose a rear surface of the outer sheet metal layer;
an A-pillar trim member having an outboard surface and a laterally-extending positioning rib; wherein the positioning rib is positionable at the recess in contact with the rear surface of the outer sheet metal layer to establish the fore-aft position of the A-pillar trim member and the outboard surface is concurrently positionable in contact with the inboard edge of the outer sheet metal layer to establish the cross-car position of the A-pillar trim member when the A-pillar trim member is assembled with the A-pillar; and
wherein the A-pillar trim member contacts the A-pillar at the rear surface and the inboard edge of the outer sheet metal layer, thereby minimizing build variation.

8. The automotive body and trim assembly of claim 7, wherein the outer sheet metal layer defines a notch at the inboard edge; wherein the A-pillar trim member has a lateral extension; and wherein the extension is postionable in the notch to establish the elevational position of the A-pillar trim member when the A-pillar trim member is assembled with the A-pillar with the positioning rib positioned at the recess in contact with the rear surface of the outer sheet metal layer and the outboard surface positioned in contact with the inboard edge of the outer sheet metal layer.

9. The automotive body and trim assembly of claim 7, wherein the A-pillar further includes a reinforcement sheet metal layer between the inner sheet metal layer and the outer sheet metal layer; and wherein the reinforcement sheet metal layer defines another recess aligned with the first recess to expose the rear face of the outer sheet metal layer.

10. The automotive body and trim assembly of claim 7 in combination with a windshield secured to the A-pillar forward thereof to define a gap between an inner surface of the windshield and the A-pillar; and wherein the A-pillar trim member substantially traverses the gap when the A-pillar trim member is assembled to the A-pillar.

11. The automotive body and trim assembly in combination with a windshield of claim 10, wherein the windshield is characterized by a blackout band positioned along a periphery thereof; and wherein the A-pillar trim member at least partially covers the blackout band when the A-pillar trim member is assembled to the A-pillar.

12. A method of assembling an interior pillar trim member and a body frame pillar having multiple sheet metal layers, comprising:
exposing a longitudinal edge and a surface of a single sheet metal layer of the body frame pillar to establish a cross-car and a fore-aft-locating feature, respectively, on the single sheet metal layer; and
contacting the body frame pillar with the interior pillar trim member at the longitudinal edge and at the surface during attachment of the pillar trim member to the body frame pillar; the longitudinal edge and the surface of the single sheet metal layer thus determining the assembled cross-car and fore-aft position of the pillar trim member; the interior pillar trim member not extending through the body frame pillar when so contacting the body frame pillar and not being secured to said body frame pillar by the contacting.

13. The method of claim 12, wherein the body frame pillar defines a notch in the longitudinal edge; wherein the interior pillar trim member has an extension; and wherein the extension is automatically guided into the notch when contacting the body frame pillar with the interior pillar trim member during attachment of the interior pillar trim member to the body frame pillar to thereby determine the elevational position of the interior pillar trim member.

* * * * *